(12) United States Patent
Mortensen et al.

(10) Patent No.: US 11,603,678 B2
(45) Date of Patent: Mar. 14, 2023

(54) TOWER VIBRATION DAMPER

(71) Applicant: Vestas Wind Systems A/S, Aarhus N. (DK)

(72) Inventors: Peter Sigfred Mortensen, Risskov (DK); Jes Grøn Andersen, Skødstrup (DK); Miroslava Vastlová, Handewitt (DE)

(73) Assignee: Vestas Wind Systems A/S, Aarhus N (DK)

( * ) Notice: Subject to any disclaimer, the term of this patent is extended or adjusted under 35 U.S.C. 154(b) by 297 days.

(21) Appl. No.: 16/334,629

(22) PCT Filed: Sep. 26, 2017

(86) PCT No.: PCT/DK2017/050308
§ 371 (c)(1),
(2) Date: Mar. 19, 2019

(87) PCT Pub. No.: WO2018/059638
PCT Pub. Date: Apr. 5, 2018

(65) Prior Publication Data
US 2020/0332548 A1    Oct. 22, 2020

(51) Int. Cl.
*E04H 9/02* (2006.01)
*F03D 13/20* (2016.01)
*F16F 7/116* (2006.01)

(52) U.S. Cl.
CPC .......... *E04H 9/0215* (2020.05); *F03D 13/20* (2016.05); *F16F 7/116* (2013.01); *F16F 2238/022* (2013.01)

(58) Field of Classification Search
CPC ..... E04H 9/0215; E04H 9/0235; F03D 80/00; F03D 13/20; Y02E 10/728; F16F 7/116; F16F 2238/022
See application file for complete search history.

(56) References Cited

U.S. PATENT DOCUMENTS 3,266,600 A * 8/1966 Brunner ............... F16F 9/12
188/322.5
3,382,629 A    5/1968 Reutlinger
(Continued)

FOREIGN PATENT DOCUMENTS

CN    101842588 A    9/2010
CN    101852188 A    10/2010
(Continued)

OTHER PUBLICATIONS

China National Intellectual Property Administration, First Notification of Office Action in CN Application No. 201780067916.0, dated May 15, 2020.
(Continued)

*Primary Examiner* — Brian E Glessner
*Assistant Examiner* — Daniel J Kenny
(74) *Attorney, Agent, or Firm* — Wood Herron & Evans LLP

(57) ABSTRACT

The present invention relates to a tower damper adapted to be mounted in a wind turbine tower, the tower damper comprising a pendulum structure adapted to be suspended in the wind turbine tower; a plurality of springs arranged to dampen movements of the pendulum structure; a suspension arrangement for suspending the pendulum structure; and a chamber holding a damping liquid into which damping liquid the pendulum structure is at least partly immersed. The present invention further relates to a wind turbine comprising a tower damper.

20 Claims, 6 Drawing Sheets

(56) References Cited

U.S. PATENT DOCUMENTS

| | | | | |
|---|---|---|---|---|
| 4,922,667 A * | 5/1990 | Kobori | ........... | E04H 9/0237 |
| | | | | 52/167.2 |
| 6,007,061 A * | 12/1999 | Kammel | ........... | B60G 15/068 |
| | | | | 188/321.11 |
| 8,418,413 B2 * | 4/2013 | Marmo | ........... | E02D 27/42 |
| | | | | 52/167.4 |
| 8,776,967 B2 * | 7/2014 | Ollgaard | ........... | F03D 7/0296 |
| | | | | 188/379 |
| 9,683,556 B2 * | 6/2017 | Ollgaard | ........... | F16F 7/10 |
| 9,896,310 B2 * | 2/2018 | Seidel | ........... | F03D 13/25 |
| 10,161,387 B2 * | 12/2018 | Frydendal | ........... | F03D 80/80 |
| 10,634,205 B2 * | 4/2020 | Wang | ........... | F16F 7/104 |
| 2011/0056151 A1 | 3/2011 | Marmo et al. | | |
| 2011/0198174 A1 | 8/2011 | Ollgaard | | |

FOREIGN PATENT DOCUMENTS

| | | |
|---|---|---|
| CN | 101874159 A | 10/2010 |
| CN | 202091424 U | 12/2011 |
| CN | 103132628 A | 6/2013 |
| CN | 204458973 U | 7/2015 |
| CN | 105745439 A | 7/2016 |
| CN | 105822507 A | 8/2016 |
| DE | 19715714 A1 | 10/1998 |
| DE | 10302687 A1 | 7/2004 |
| EP | 0206348 A2 | 12/1986 |
| EP | 1008747 B1 | 6/2000 |
| EP | 3048295 A1 | 7/2016 |
| JP | S622032 A | 1/1987 |
| JP | S6252646 U | 4/1987 |
| JP | S63147072 A | 6/1988 |
| JP | H08270724 A | 10/1996 |

OTHER PUBLICATIONS

Danish Patent and Trademark Office, Search and Examination Report in PA 2016 70760, dated Feb. 23, 2017.

European Patent Office, International Search Report and Written Opinion in PCT Application No. PCT/DK2017/050308, dated Nov. 23, 2017.

European Patent Office, Examination Report in EP Application No. 17777782.8, dated Mar. 11, 2022.

Japanese Patent Office, Notice of Reasons for Refusal in JP Application No. 2019-538311, dated Apr. 30, 2021.

European Patent Office, Examination Report in EP Application No. 17777782.8, dated Jun. 9, 2022.

* cited by examiner

TOWER VIBRATION DAMPER

FIELD OF THE INVENTION

The present invention relates to a tower vibration damper to be mounted in for example a wind turbine tower. The vibration damper according to the present invention has a through-going opening that facilitates that for example service personal may pass by the vibration damper in an easy and safe way.

BACKGROUND OF THE INVENTION

Damping of vortex induced vibrations within for example the wind turbine industry has become more important over the recent years as the height of modern wind turbine generators becomes higher and higher.

Generally, vortex induced vibrations may be damped by either changing the shape of the structure being exposed to the wind, or changing the vibrational properties of the structure being exposed to the wind. Changing the shape of the structure may involve that for example spoilers are secured to the outer surfaces of the structure, while changing the vibrational properties of the structure may involve that the natural frequency of the structure is changed, or a vibration damper is added to the structure. The vibration damper is placed close to the free end of the structure, i.e. the top.

In relation to wind turbine towers it is necessary to maintain a passageway between the top and bottom of the tower in order to allow service personnel to climb up inside the tower to access the nacelle when performing maintenance on the turbine. There are therefore space restrictions in relation to placing a vibration damper inside a wind turbine tower.

It may be seen as an object of embodiments of the present invention to provide a simple, compact and robust tower vibration damper that allows service personal to pass by the vibration damper in an easy and safe way inside the tower.

DESCRIPTION OF THE INVENTION

The above-mentioned objects are complied with by providing, in a first aspect, a tower damper adapted to be mounted in a wind turbine tower, the tower damper comprising:
- a pendulum structure adapted to be suspended in the wind turbine tower, said pendulum structure comprising a cylindrically shaped pendulum body,
- a plurality of springs arranged to dampen movements of the pendulum structure when suspended in the wind turbine tower,
- a suspension arrangement for suspending the pendulum structure in the wind turbine tower such that the pendulum structure is allowed to displace from a neutral position for the pendulum structure, and
- a chamber holding a damping liquid into which damping liquid the pendulum structure is at least partly immersed.

The tower damper of the present invention is advantageous due to its simple, compact and robust design. Moreover, the cylindrically shaped pendulum body allows service personal to pass by the vibration damper in an easy and safe way inside the tower. The pendulum structure may be made of metal and its weight may be in the range 3 to 10 tons depending on the specific requirement.

The number of springs may in principle be arbitrary. However, the number of springs should be sufficient to fulfil the required damping demands. Preferable, the number of springs is a multiple of 3, i.e. 3, 6, 9, 12, 15, 18 etc. In order to ensure symmetric damping properties around the pendulum structure the springs may be evenly distributed around a centre axis of the pendulum structure or around a centre axis of the wind turbine tower.

The suspension arrangement may comprise a plurality of wires suspending the pendulum structure. Moreover, tuning means configured for adjusting the natural frequency of the tower damper may be provided as well. The natural frequency may be adjusted by altering the length of the plurality of wires. The tuning means may comprise, for each of said plurality of wires, a clamp secured to the tower at one end and to the wire at the other end. In order to adjust the length of the wires, and thereby adjust the natural frequency of the tower damper, the securing of the clamp to the tower is configured such that the clamp may be movable along the longitudinal direction of the wire. In the present context the term "length of the wires" should be taken to mean the length of the wires that are free to swing, i.e. the distance between the tuning means, where the wires are attached to the tower structure, and the pendulum structure. The wires may move angularly below the tuning means thereby allowing the pendulum structure to swing.

The chamber may comprise an outer boundary, an inner boundary and a bottom part extending between the outer boundary and the inner boundary. The chamber thus forms a container structure suitable for holding the damping liquid into which the pendulum structure is at least partly immersed. The damping liquid may comprise a suitable damping oil, for example products such as Texaco Way Lubricant x320, Exxon Mobilgear 600 XP 320 or Uno Vibration Absorber 320.

In one embodiment the chamber is a separate self-contained element with its own structure dedicated to the purpose of containing the damping liquid.

In a further embodiment the chamber is integrated into the wind turbine tower structure. For example by the wind turbine wall defining the outer boundary of the chamber.

In a first embodiment the plurality of springs may be arranged between the pendulum structure and the inner boundary of the chamber.

In a second embodiment the plurality of springs may be arranged between the pendulum structure and the outer boundary of the chamber.

The plurality of springs may be leaf springs or cantilever springs.

In embodiments with leaf springs, each of the springs may, at both of its two ends, comprise leaf spring securing means for securing the leaf spring to the pendulum structure.

In a first preferred embodiment of the invention the plurality of springs is arranged between the pendulum structure and the inner boundary of the chamber and the plurality of springs are leaf springs.

In a second preferred embodiment of the invention the plurality of springs is arranged between the pendulum structure and the outer boundary of the chamber and the plurality of springs are cantilever springs.

In all embodiments the plurality of springs are arranged for urging the pendulum structure towards a neutral position for the pendulum structure. In the neutral position the springs may be relaxed. Alternatively the springs are pre-loaded in the neutral position of the pendulum.

In embodiments, of the present invention, comprising a plurality of leaf springs, the tower damper may further comprise a contact arrangement for each of said plurality of leaf springs, wherein each contact arrangement is configured to provide operable contact between a leaf spring and the inner or outer boundaries of the chamber at a position between the two ends of the leaf spring, wherein the contact arrangement comprises a contact member, a guide configured for enabling vertical translation of the contact member, said vertical translation being induced by a displacement of the pendulum structure, and a contact member spring arranged on each side of the contact member, said contact member spring being configured for, in concert, urging the contact member towards a neutral position for the contact member.

The contact member may comprise a rotatable mounted roller and the contact member spring may comprise a helical or torsion spring. The rotatable mounted roller may be rotatable around a pin along which pin the roller is allowed to perform vertical translations. The contact member springs are arranged on each side of the contact member and configured such that, when the contact member is displaced vertically from its neutral position, they will act, in concert, to urge the contact member back to its neutral position.

Each of the leaf spring securing means for securing the leaf springs to the pendulum structure may comprise a pair of rotatable rollers adapted to receive and clamp a leaf spring end, wherein the rollers are configured to flex in such a way that the leaf spring can move angularly in relation to the leaf spring securing means.

The rotatable rollers acts as a rolling support being able to accommodate for both the local translation of the end of the leaf spring due to deflections of the leaf spring at its centre as well as angular deflections of the end of the leaf spring.

Moreover, the securing leaf spring may further comprise a pivotable arrangement adapted to hold a leaf spring end in a pivotable manner, wherein the pivotable arrangement is configured to prevent the leaf spring end from translating in the longitudinal direction The leaf spring securing means is advantageous in that the pivotable arrangement acts as a pinned suspension being able to pivot due to deflections of a leaf spring. The pivotable arrangement also prevents the leaf spring from translation in the longitudinal direction.

In this embodiment the leaf spring has a pair of rotatable rollers at one end and a pivotable arrangement at its other end.

The plurality of leaf springs may form an end-to-end structure between the pendulum structure and the inner boundary of the chamber, and wherein a contact arrangement is attached to each leaf spring. For example, the plurality of leaf springs may form a hexagonal structure within the pendulum structure, wherein the leaf springs are secured to the pendulum structure via respective leaf spring securing means.

Alternatively the plurality of leaf springs may form an end-to-end structure between the pendulum structure and the outer boundary of the chamber, and wherein a contact arrangement is attached to each leaf spring.

In embodiments, of the present invention, comprising a plurality of cantilever springs, each cantilever spring may comprise a low-friction slide block arranged on a free end of the cantilever spring and wherein the slide block is configured for operable contact between the cantilever spring and the outer or inner boundary of the chamber. A suitable low-friction slide block may comprise a bronze block attached to the free end of each of the cantilever springs.

In a second aspect the present invention relates to a wind turbine tower comprising a tower damper according to the first aspect.

BRIEF DESCRIPTION OF THE DRAWINGS

The present invention will now be described in further details with reference to the accompanying figures, wherein.

Figure 1:
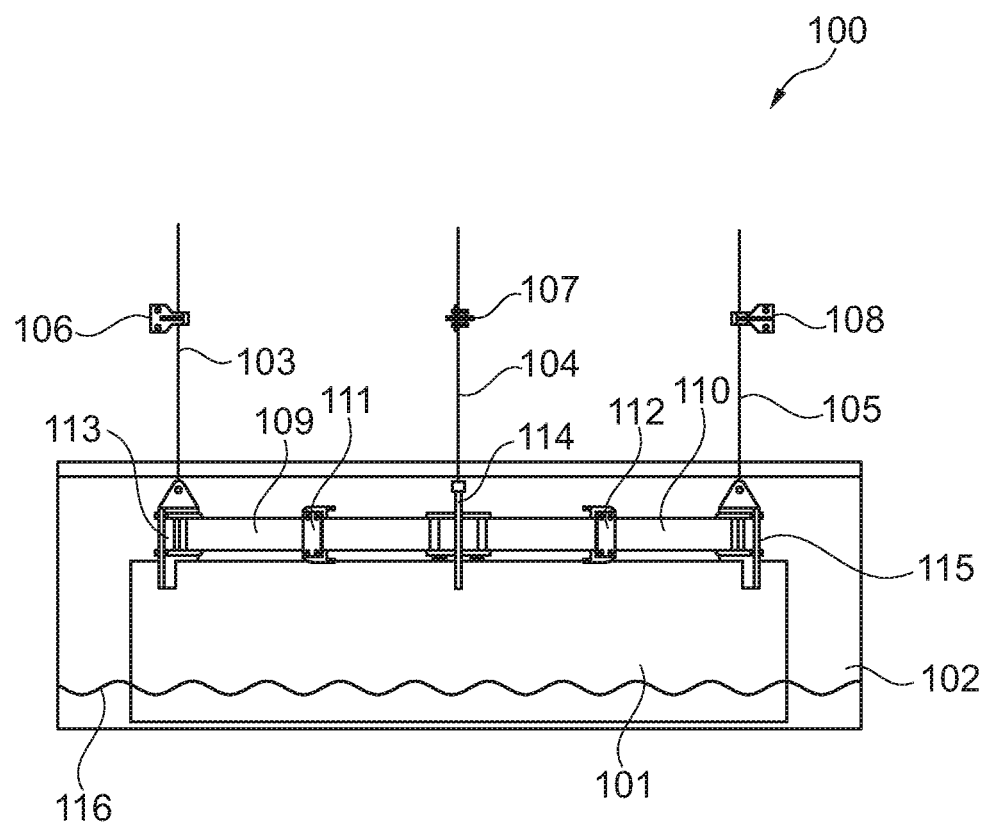
FIG. 1 shows a side view of a first preferred embodiment of the present invention.

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In its broadest aspect the present invention relates to a tower vibration damper having a simple, compact and robust design. The tower vibration damper of the present invention may advantageously be mounted in for example wind turbine towers in that the tower vibration damper of the present invention enables service personal to pass by the damper when accessing the nacelle in connection with service or breakdown of a wind turbine generator.

As the vortex induced vibrations are most pronounced before the nacelle is installed, the tower vibration damper of the present invention may thus be installed and operated in wind turbine towers during transport and/or storage thereof. The tower vibration damper may be dismantled after the wind turbine has been assembled and reused in another tower. Alternatively, the tower vibration damper of the present invention may remain installed in the wind turbine tower during its operational lifetime.

Referring now to FIG. 1, a side view of a first preferred embodiment of the tower damper 100 of the present invention is depicted. FIG. 1 shows a cylindrically shaped pendulum structure 101 being suspended in three wires 103, 104, 105. The weight of the pendulum structure may be in the range of 3-10 tons depending on the required damping performance and the size of the wind turbine tower. Typically, the weight of the pendulum structure 101 is around 6-7 tons. The length of the wires 103, 104, 105 sets the natural frequency of the vibration damper. Thus, by varying the length of the wires 103, 104, 105 the natural frequency of the vibration damper may be altered and thereby tailored to specific demands.

In the present application the term "length of the wires" is relating to the length of the wires that are free to swing, i.e. the distance between the suspension where the wire is attached to the tower structure or an intermediate fixation arrangement between the suspension and the pendulum structure. Common for the suspension and the intermediate fixation arrangement is that the wire is fixed at least in relation to lateral displacement. The wire may move angularly below the suspension or intermediate fixation arrangement allowing the pendulum structure to swing.

In the first preferred embodiment depicted in FIG. 1 the length of the wires 103, 104, 105 may be altered by moving the respective wire fixation arrangements or tuning means in the form of clamps 106, 107, 108 up and down. The natural frequency of the vibration damper is tuned to match the natural frequency of the wind turbine tower which is typically below 1 Hz, such as between 0.8 Hz and 0.9 Hz. The lengths of the three wires 103, 104, 105 are generally adjusted to comply with specific demands. Typically, the lengths are between 1 meter and 3 meters. During damping operations the pendulum structure 101 typically moves sideways with an amplitude of up to +/−200 mm.

As depicted in FIG. 1 the pendulum structure 101 is at least partly positioned in a chamber 102 that contains a damping liquid 116, when the tower damper 100 is operative. The pendulum structure 101 is at least partly immersed into this damping liquid in order to dampen movements of the pendulum structure. The damping liquid may comprise a suitable damping oil, such as Texaco Way Lubricant x320, Exxon Mobilgear 600 XP 320 or Uno Vibration Absorber 320.

As seen in FIG. 1 leaf springs 109, 110 in the form of flat spring elements are secured to the pendulum structure at point 113, 114, 115. At or near the centre of each of the leaf springs 109, 110 a contact arrangement in the form of a spring-loaded roller 111, 112 is provided. When the pendulum structure 101 is in its neutral position each of the leaf springs 109, 110 are in a relaxed state.

The tower vibration damper of the present invention is adapted to be installed at a position as high as possible inside a vertical wind turbine tower. Typically, an installation of the tower vibration damper within the upper ⅓ of a vertical wind turbine tower will provide effective damping of tower vibrations.

Figure 2:
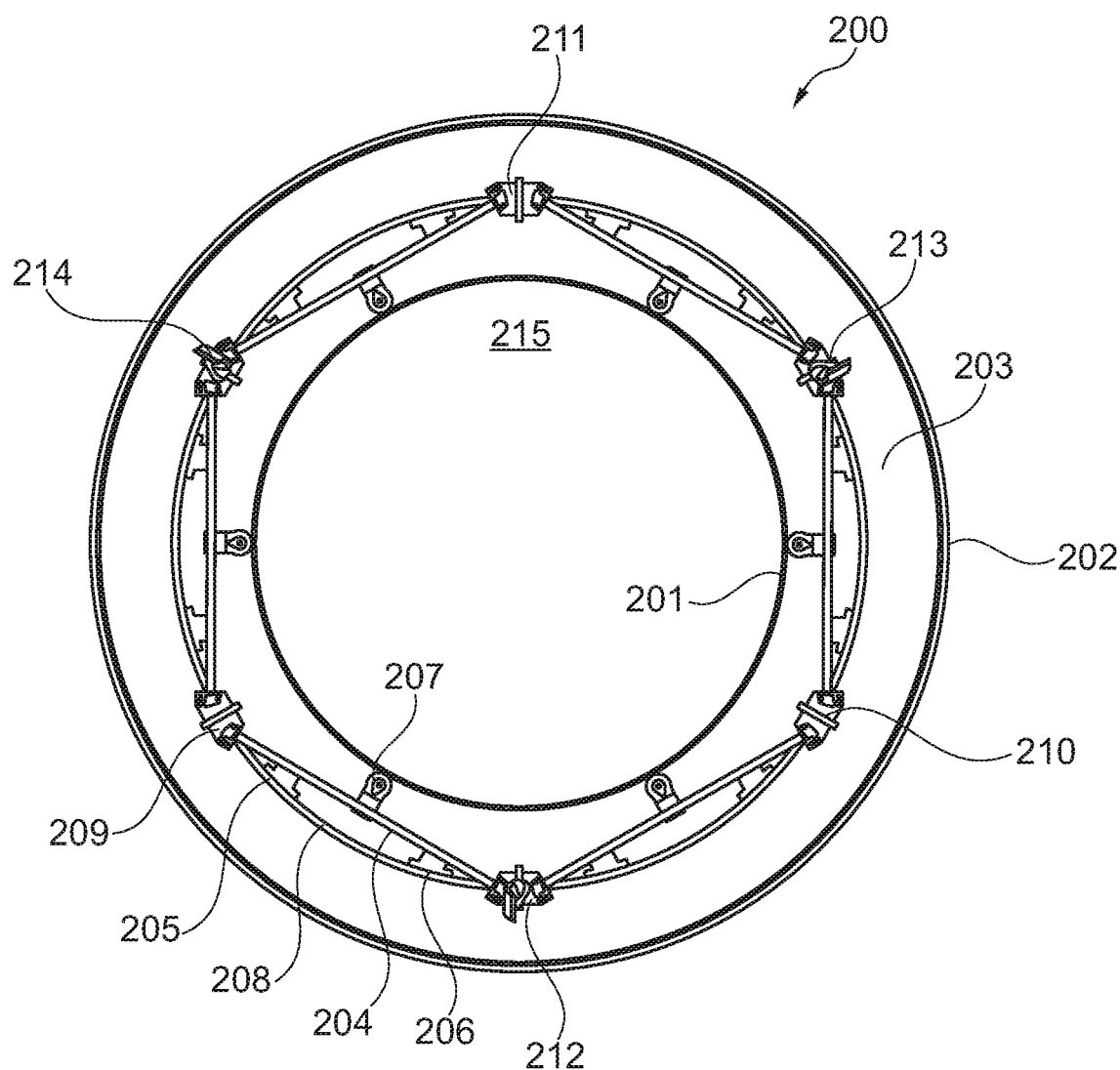
FIG. 2 shows a top view of the embodiment in FIG. 1.

Referring now to FIG. 2 a top view of the first preferred embodiment 200 is depicted. As addressed in connection with FIG. 1 the cylindrically shaped pendulum structure 208 is at least partly positioned in a chamber having an outer boundary 202, an inner boundary 201 and a bottom part 203. The outer boundary 202 of the chamber may be formed by the tower wall. The pendulum structure 208 as well as the chamber has a through-going opening 215. This through-going opening 215 may be used by service personal as an easy and safe passage through the vibration damper in case a wind turbine generator is to be serviced or repaired. As already addressed the chamber is at least partly filled with a suitable damping oil (not shown) into which damping oil the pendulum structure is as least partly immersed.

As seen in FIG. 2 a total of six leaf springs 204 form a hexagonal structure within the pendulum structure 208. The six leaf springs are secured to the pendulum structure 208 via connectors 209, 210, 211, 212, 213 which are disclosed in more details in connection with FIG. 3a. The pendulum structure 208 is adapted to be suspended in a wire arrangement, cf. FIG. 1, at connectors 212, 213, 214.

Each leaf spring 204 is in a relaxed state as long as the pendulum structure 201 is in its neutral position. A contact arrangement in the form of a spring-loaded rollers 207 may be just contacting the inner boundary 201 of the chamber without applying a significant force.

If the pendulum structure 201 swing away from its neutral position some of the spring-loaded rollers 207 will be in contact with the inner boundary 201 of the chamber and the remaining spring loaded rollers will be free of contact with the inner boundary 201 of the chamber. The leaf springs 204 that are in contact with the inner boundary 201 of the chamber via the spring-loaded rollers 207 applies a force to the inner boundary 201 that urges the pendulum structure 201 back towards its neutral position.

Figure 3A:
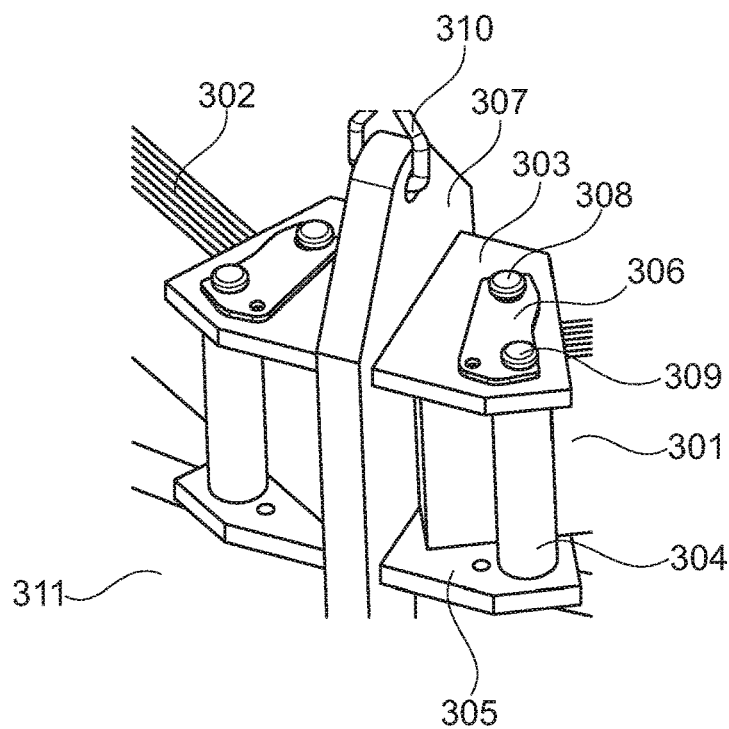
FIG. 3*a-b* shows embodiments of a leaf spring securing means
Figure 3B:
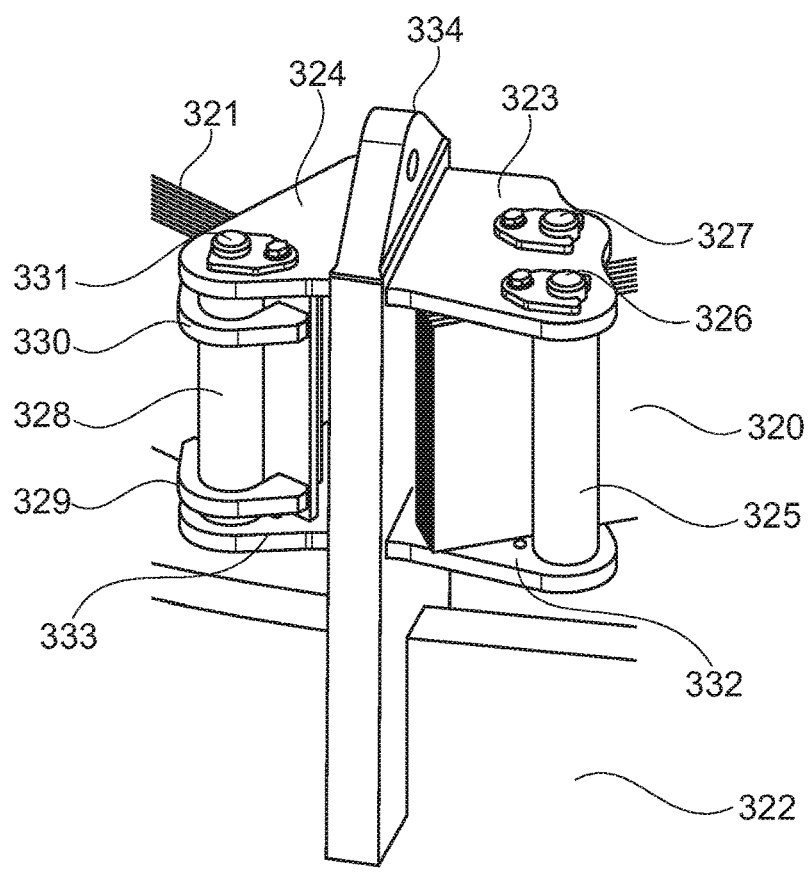
Figure 3C:
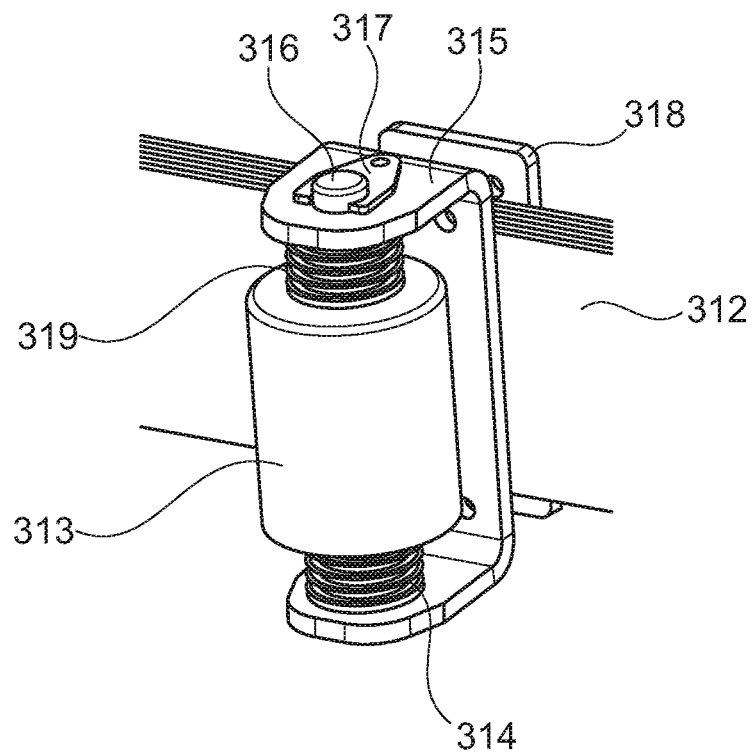
FIG. 3*c* shows a contact arrangement to be used in relation to the embodiment in FIG. 1.

The spring-loaded rollers 207 are disclosed in more details in connection with FIG. 3c. In order to achieve a fully direction independent composite stiffness the properties of the six leaf springs are similar, and they are equally distributed around the pendulum structure 208 as well.

In order to limit the swing amplitude of the pendulum structure 208 and not damage the pendulum structure itself or the leaf springs 204 a resilient buffer arrangement 205, 206 is provided between the pendulum structure 208 and each of the leaf springs 204. The buffer arrangement 205, 206 may be implemented in various ways, such as a rubber material.

Each leaf spring may comprise a plurality of individual leaves which are stacked to form the final leaf spring. The number of individual leaves may be selected in accordance with specific demands, such as required stiffness, damping, natural frequency etc. In the first preferred embodiment shown in FIGS. 1 and 2 six individual springs have been stacked to form each of the six leaf springs. The spring material may either be ultra-high strength plate material or common commercial spring steel, such as for example be UHS/Weldox 1300 plate. It should be noted however that the number and the dimensions of the individual springs are generally selected so as to meet a required stiffness in order to obtain the required damping characteristics of the pendulum structure.

FIG. 3a shows how two leaf springs 301, 302 may be mutually connected and secured to the pendulum structure 311 through a leaf spring securing means. The leaf spring securing means shown in FIG. 3a comprises a frame structure having a top portion 307 being adapted to be suspended in a wire arrangement via connector 310. Each leaf spring, say for example 301, is arranged between two frame portions 303, 305 as well as between two rotatable rollers 304 (only one is visible) which are kept in position by respective pins 308, 309. The pins 308, 309 are locked in position by the locking plate 306. The leaf spring securing means shown in FIG. 3a facilitates that the leaf springs 301, 302 are allowed to bend slightly when pressure are applied to them.

FIG. 3b shows another way of mutually connecting two leaf springs 320, 321 and securing them to the pendulum structure 322 through a leaf spring securing means. Similar to FIG. 3a the a leaf spring securing means shown in FIG. 3b comprises a frame structure having a top portion 334 being adapted to be suspended in a wire arrangement (not shown). Leaf spring 320 is arranged between two frame portions 323, 332 as well as between two rotatable rollers 325 (only one is visible) which are kept in position by respective pins 326, 327. The pins 326, 327 are locked in position by respective locking plates. Leaf spring 321 is arranged between two frame portions 324, 330 and is allowed to pivot around roller 328 via mounts 329, 330. The roller 328 is kept in position by pin 331. The pin 331 is locked in position by a locking plate. The arrangement depicted in FIG. 3b is advantageous in that the left side of the suspension being acts as a pinned suspension being able to pivot due to deflections of the leaf spring 321. The pinned connection on the left side also prevents the leaf spring 321 from translating in the longitudinal direction. The right side of the arrangement depicted in FIG. 3b acts as a rolling support being able to accommodate both local translations of the end of the leaf spring 320 due to deflections of the leaf spring at its centre as well as angular deflections of the end of the leaf spring 320. The angular deflections also originate from deflections of the leaf spring at its centre. The inner roller (now shown) prevents the unloaded leaf spring to fall out.

FIG. 3c shows a contact arrangement in the form of a roller module to be positioned at or near the centre of each leaf spring 312. The roller module comprises a frame structure 315 and mounting plate 318 between which the leaf spring 312 is sandwiched. A rotatable roller 313 is mounted around a pin 316 which is locked in position by locking plate 317. A pair of spring elements 314, 319 ensures that the roller 313 returns to its neutral position after a vertical translation induced by a displacement of the pendulum structure which perform an arc circle movement.

Figure 4:
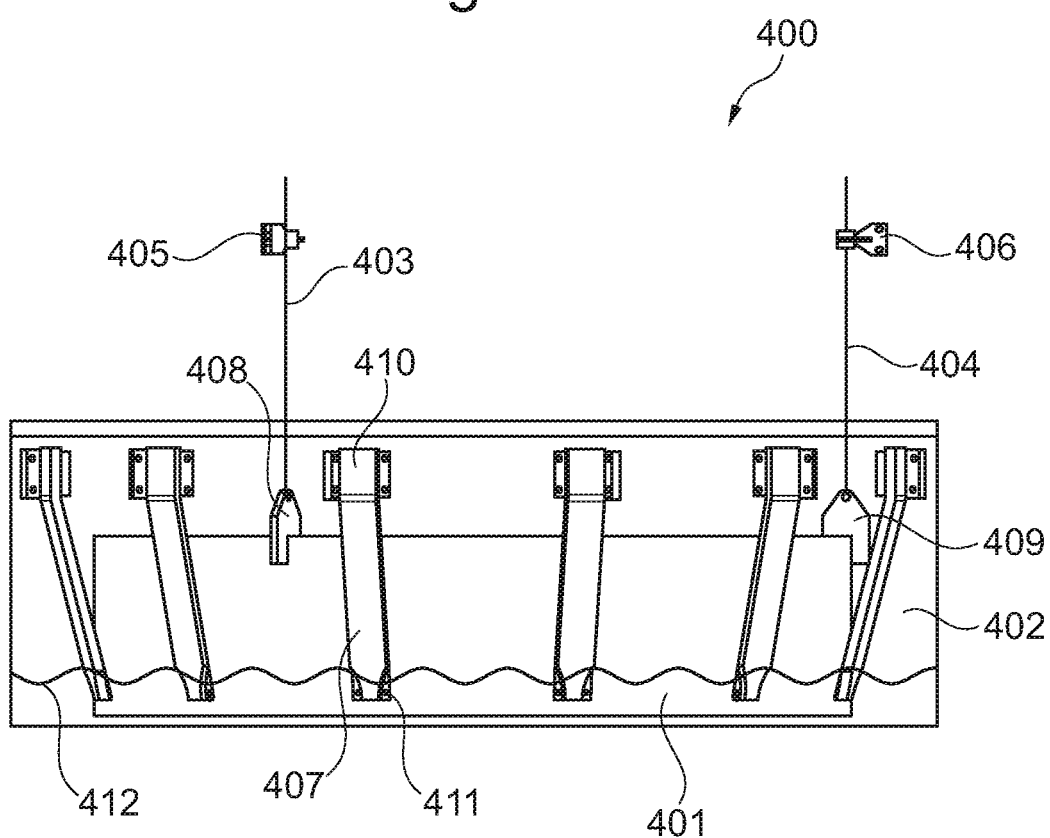
FIG. 4 shows a side view of a second preferred embodiment of the present invention.

Turning now to FIG. 4 a second preferred embodiment 400 of the present invention is depicted. Similar to the first preferred embodiment depicted in FIGS. 1-3 the pendulum structure 401 is at least partly positioned in a chamber 402 which also contains a suitable damping oil 412 into which damping oil the pendulum structure 401 is at least partly immersed. The pendulum structure is suspended in a wire arrangement 403, 404 which is secured to the pendulum structure 401 via respective connectors 408, 409. The length of these wires 403, 404 sets the natural frequency of the vibration damper. Thus, by changing the length of the wires 403, 404 the natural frequency of the vibration damper may be altered and thereby tailored to specific demands. The length of the wires 403, 404 may be altered by moving the respective wire fixation arrangements or tuning means in the form of clamps 405, 406 up and down.

As seen in FIG. 4 a plurality of springs 407 in the form of cantilever springs are arranged between the chamber 402 and the pendulum structure 401. Each of the cantilever springs 407 is secured to an outer boundary of the chamber at one of its ends 410 while the opposite end 411 of the cantilever spring 407 is abutting the pendulum structure 401 in the neutral position of the pendulum structure 401 without being secured thereto. Thus, when the pendulum structure 401 is displaced, the free end 411 of the cantilever springs 407 in contact with the pendulum structure 401 slides across an outer surface of the pendulum structure 401. The implementation of the cantilever leaf springs 407 are disclosed in further details in FIG. 6.

Figure 5:
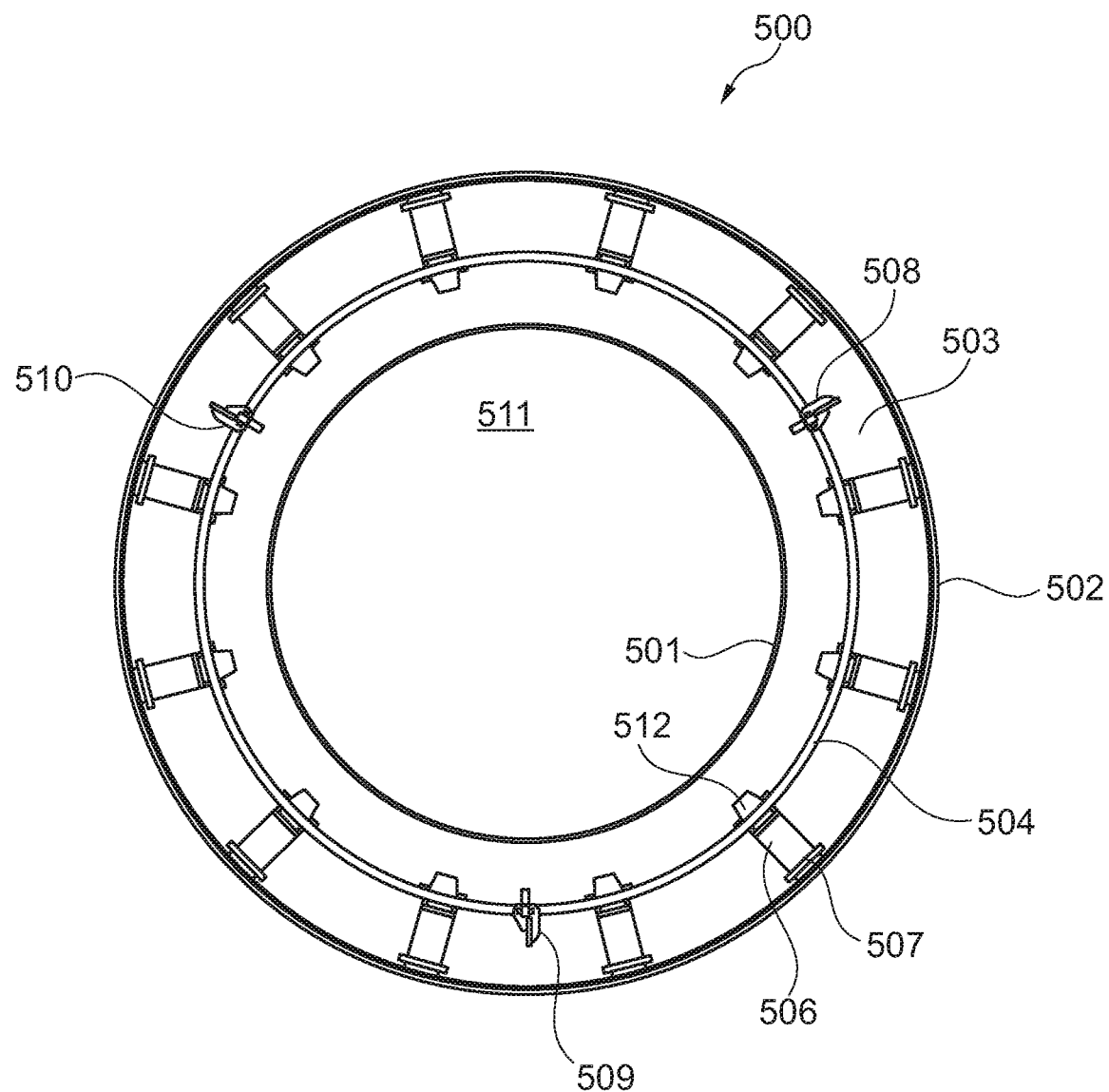
FIG. 5 shows a top view of the embodiment in FIG. 4.

FIG. 5 shows a top view of the second preferred embodiment 500 of the present invention. In FIG. 5 the cylindrically shaped pendulum structure 504 is at least partly positioned in the chamber having an outer boundary 502, an inner boundary 501 and a bottom part 503. The outer boundary 502 of the chamber may be formed by the tower wall. Similar to the first preferred embodiment the pendulum structure 504 as well as the chamber has a through-going opening 511. This through-going opening 511 may be used by service personal as an easy and safe passage through the vibration damper in case a wind turbine generator is to be serviced or repaired. As already addressed the chamber is at least partly filled with a suitable damping oil (not shown) into which damping oil the pendulum structure is as least partly immersed. The pendulum structure 504 is adapted to be suspended in a wire arrangement at connectors 508, 509, 510.

A total number of twelve cantilever springs 506 are secured at one end 507 to the outer boundary 502 of the chamber. The opposite ends of the respective cantilever springs 506 are adapted to abut and thereby slide across the outer surface of the pendulum structure 504 in response to displacements thereof. Alternatively, a through-going insert 512 may be incorporated into the pendulum structure 504 for each of the cantilever springs 506. The free end of the respective cantilever springs 506 are adapted to abut and slide on the respective inserts 512.

Figure 6:
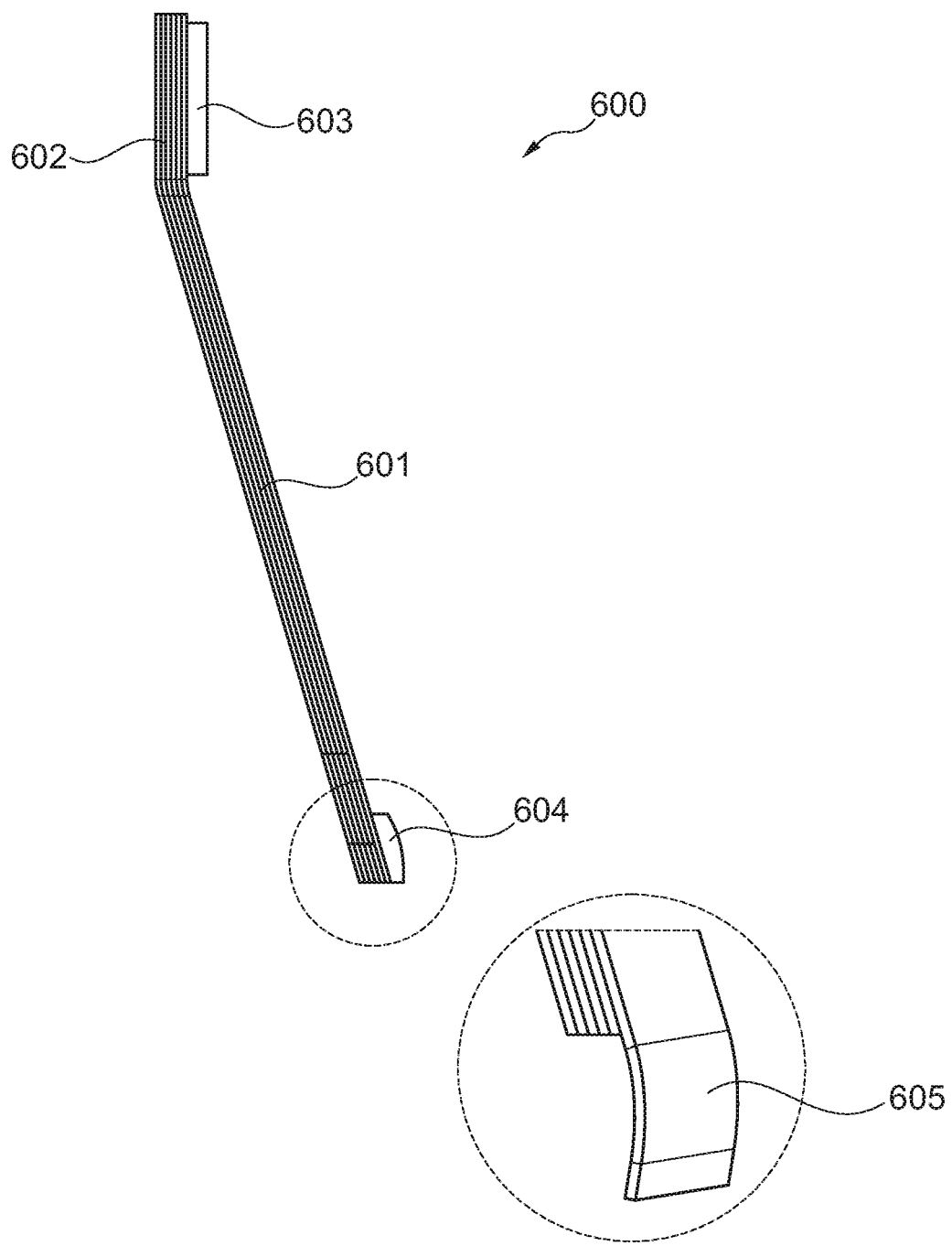
FIG. 6 shows a cantilever-shaped spring to be used in relation to the embodiment in FIG. 4.

FIG. 6 shows two examples of a cantilever spring 600 to be used in connection with the second embodiment of the present invention. As depicted in FIG. 6 the cantilever spring 600 is formed by two parts 601, 602. The upper part 602 is adapted to be secured to the chamber using the clamping plate 603, whereas the lower part 601 is adapted to act as a resilient part as the lower end thereof is adapted to abut and slide across the outer surface of the pendulum structure. Each cantilever spring 600 may comprise a plurality of individual leaves which are stacked to form the final cantilever spring 600. The number of individual leaves may be selected in accordance with specific demands. The spring material may for example be UHS/Weldox 1300 plate.

A low friction slide block in the form of a bronze pad 604 may be provided at the lower end of the cantilever spring 600 in order to reduce friction between the cantilever spring 600 and the pendulum structure 504. Alternatively, one of the individual leaves 605 forming the cantilever spring 600 may be extended and slightly bend to reduce friction.

The invention claimed is:

1. A wind turbine tower having a tower damper, the tower damper comprising:
a pendulum structure suspended in the wind turbine tower, said pendulum structure comprising a cylindrically shaped pendulum body,
a plurality of springs arranged to dampen movements of the pendulum structure when suspended in the wind turbine tower,
a suspension arrangement for suspending the pendulum structure in the wind turbine tower such that the pendulum structure is allowed to displace from a neutral position for the pendulum structure, and
a chamber holding a damping liquid between an outer boundary, an inner boundary, and a bottom part that extends between the outer boundary and the inner boundary of the chamber, wherein the pendulum structure is at least partly immersed in the damping liquid.

2. The wind turbine tower according to claim 1, wherein the number of springs are a multiple of three.

3. The wind turbine tower according claim 1, wherein the outer boundary of the chamber forms part of the wind turbine tower wall.

4. The wind turbine tower according to claim 1, wherein the springs are evenly distributed around a centre axis of the pendulum structure or around a centre axis of the wind turbine tower.

5. The wind turbine tower according to claim 1, wherein the springs are arranged between the pendulum structure and the inner boundary of the chamber.

6. The wind turbine tower according to claim 1, wherein the springs are arranged between the pendulum structure and the outer boundary of the chamber.

7. The wind turbine tower according to claim 1, wherein the plurality of springs are arranged for urging the pendulum structure towards a neutral position for the pendulum structure.

8. The wind turbine tower according to claim 1, wherein each of the plurality of springs comprises a leaf spring.

9. The wind turbine tower according to claim 8, wherein each leaf spring at both of its two ends comprises leaf spring securing means for securing the leaf spring to the pendulum structure.

10. A wind turbine tower according to claim 9, further comprising a contact arrangement for each of said plurality of leaf springs, wherein each of said contact arrangement is configured to provided operable contact between a leaf spring and an inner or outer boundary of the chamber at a position between the two ends of the leaf spring, wherein the contact arrangement comprises:
- a contact member,
- a guide configured for enabling vertical translation of the contact member, said vertical translation being induced by a displacement of the pendulum structure, and
- a contact member spring arranged on each side of the contact member, said contact member spring being configured for, in concert, urging the contact member towards a neutral position for the contact member.

11. The wind turbine tower according to claim 10, wherein each leaf spring securing means comprises:
- a pair of rotatable rollers adapted to receive and clamp a leaf spring end, wherein the rollers are configured to flex in such a way that the leaf spring can move angularly in relation to the leaf spring securing means.

12. The wind turbine tower according to claim 10, wherein the plurality of leaf springs form an end-to-end structure between the pendulum structure and the inner boundary of the chamber, and wherein a contact arrangement is attached to each leaf spring.

13. The wind turbine tower according to claim 1, wherein each of the plurality of springs comprises a cantilever spring.

14. The wind turbine tower according to claim 13, wherein each cantilever spring comprises a low-friction slide block arranged on a free end of the cantilever spring and wherein the slide block is configured for operable contact between the cantilever spring and the outer or inner boundary of the chamber.

15. The wind turbine tower according to claim 1, wherein the suspension arrangement comprises tuning means configured for adjusting the natural frequency of the suspended pendulum structure.

16. The wind turbine tower according to claim 15, wherein the suspension arrangement comprises a plurality of wires.

17. The wind turbine tower according to claim 15, wherein the tuning means comprises, for each of said plurality of wires, a clamp secured to the tower at one end and to the wire at the other end, wherein the securing of the clamp is configured such that the clamp is movable along the longitudinal direction of the wire.

18. The wind turbine tower according to claim 1, wherein the cylindrically shaped pendulum body of the pendulum structure is an annular ring.

19. The wind turbine tower according to claim 1, wherein the outer boundary, inner boundary, and bottom part of the chamber form an annular trough.

20. The wind turbine tower according to claim 1, wherein the tower damper further includes a plurality of buffer arrangements provided between the pendulum structure and each spring.

* * * * *